US010139240B2

(12) United States Patent
Kim

(10) Patent No.: US 10,139,240 B2
(45) Date of Patent: Nov. 27, 2018

(54) NAVIGATION DEVICE PROVIDING PATH INFORMATION AND METHOD OF NAVIGATION

(71) Applicant: HYUNDAI MOTOR COMPANY, Seoul (KR)

(72) Inventor: Dong Uk Kim, Incheon (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 192 days.

(21) Appl. No.: 15/253,110

(22) Filed: Aug. 31, 2016

(65) Prior Publication Data

US 2017/0138757 A1 May 18, 2017

(30) Foreign Application Priority Data

Nov. 12, 2015 (KR) .......................... 10-2015-0159129

(51) Int. Cl.
*G01C 21/36* (2006.01)

(52) U.S. Cl.
CPC ..... *G01C 21/3629* (2013.01); *G01C 21/3605* (2013.01); *G01C 21/3688* (2013.01); *G01C 21/3667* (2013.01)

(58) Field of Classification Search
CPC .... G01C 21/3629; G01C 21/26; G01C 21/34; G01C 21/3423; G01C 21/36; G01C 21/3605; G01C 21/362; G01C 21/3626; G01C 21/3676; G01C 21/3688; G01C 21/3667
See application file for complete search history.

(56) References Cited

U.S. PATENT DOCUMENTS

| 2011/0093194 A1* | 4/2011 | Paik | G01C 21/32 701/532 |
| 2011/0320114 A1* | 12/2011 | Buxton | G01C 21/3608 701/439 |
| 2013/0103313 A1 | 4/2013 | Moore et al. | |
| 2014/0163870 A1 | 6/2014 | Riley | |

FOREIGN PATENT DOCUMENTS

| JP | 3441933 B2 | 9/2003 |
| KR | 10-278972 B1 | 1/2001 |
| KR | 10-2009-0069997 A | 7/2009 |
| KR | 10-2011-0041325 A1 | 4/2011 |
| KR | 10-1055155 B1 | 8/2011 |
| KR | 10-2012-0035381 A | 4/2012 |
| KR | 10-2014-0014262 A | 2/2014 |
| KR | 10-2015-0043823 A | 4/2015 |
| KR | 10-2015-0091392 A | 8/2015 |
| KR | 10-2015-0102463 * | 9/2015 |
| KR | 10-2015-0102463 A | 9/2015 |

* cited by examiner

*Primary Examiner* — Spencer D Patton
(74) *Attorney, Agent, or Firm* — McDermott Will & Emery LLP

(57) ABSTRACT

A navigation device for a vehicle includes a communication module for communicating with a user terminal, a display, and a processor for setting a navigation destination, searching a first path toward the navigation destination, receiving second path information corresponding to a second path toward the navigation destination from the user terminal through the communication module, and displaying first path information and the second path information on the display depending on a predetermined display mode.

18 Claims, 7 Drawing Sheets

NAVIGATION DEVICE PROVIDING PATH INFORMATION AND METHOD OF NAVIGATION

CROSS-REFERENCE TO RELATED APPLICATION

This application claims the benefit of priority to Korean Patent Application No. 10-2015-0159129, filed on Nov. 12, 2015 with the Korean Intellectual Property Office, the disclosure of which is incorporated herein in its entirety by reference.

TECHNICAL FIELD

The present disclosure relates to a navigation device for a vehicle capable of providing path information up to a destination to a driver, and a method of navigation.

BACKGROUND

A driver may use a navigation device in order to receive guidance on a path up to a destination or traffic information. Therefore, recent vehicles may have a navigation function, or device, such as an AVN (audio, video, navigation). Meanwhile, in accordance with the development of an electronic technology, smart phones capable of providing various functions have been used. Users may use a navigation function through a navigation application installed in a smart phone.

A case in which the navigation device mounted in the vehicle and the navigation application installed in the smart phone search a path up to the same destination by different methods may occur. The navigation applications installed in the smart phones may provide improved functionality as compared with navigation devices mounted in vehicles due to rapid updates. However, a case in which the user undergoes inconvenience when a path is provided through the smart phone due to a limited size of a display of the smart phone may occur.

SUMMARY

The present disclosure has been made to solve the above-mentioned problems occurring in the prior art while advantages achieved by the prior art are maintained intact.

An aspect of the present disclosure provides a navigation device for a vehicle capable of simultaneously providing path information provided from each of the navigation device for a vehicle and a user terminal to a user. An aspect of the present disclosure also provides a navigation device capable of stably providing a path on the basis of position information received from another device even in the case in which a current position is not normally decided due to a communication defect, or the like.

According to an exemplary embodiment of the present disclosure, a navigation device for a vehicle may include: a communication module for communicating with a user terminal; a display; and a processor for setting a navigation destination, searching a first path toward the navigation destination, receiving second path information corresponding to a second path toward the navigation destination from the user terminal through the communication module, and displaying first path information and the second path information on the display depending on a predetermined display mode.

According to another exemplary embodiment of the present disclosure, a path information providing method of a navigation device for a vehicle may include: setting a navigation destination; searching a first path toward the navigation destination; receiving second path information corresponding to a second path toward the navigation destination from a user terminal through a communication module; and displaying first path information and the second path information on a display depending on a predetermined display mode.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Hereinafter, the present disclosure will be described in detail with reference to the accompanying drawings. In this application, when a particular path is described as being set "to" another path, it is to be understood that this description may also mean that the particular path is being set "as" the other path.

Figure 1:
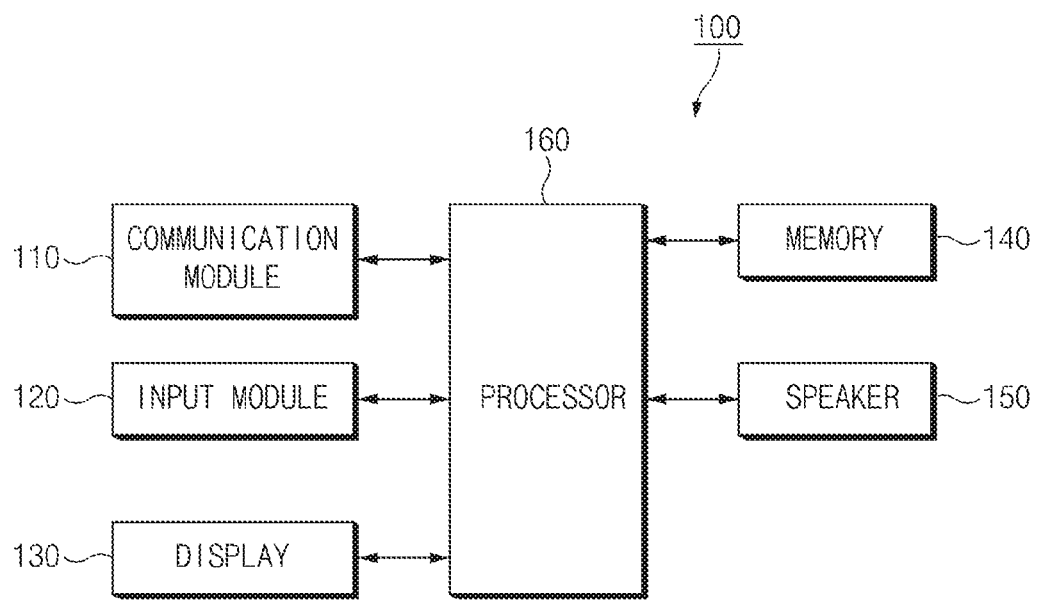
FIG. 1 is a block diagram illustrating a configuration of a navigation device for a vehicle according to various exemplary embodiments of the present disclosure.

FIG. 1 is a block diagram illustrating a configuration of a navigation device for a vehicle according to various exemplary embodiments of the present disclosure.

Referring to FIG. 1, the navigation device 100 for a vehicle may include a communication module 110, an input module 120, a display 130, a memory 140, a speaker 150, and a processor 160. The navigation device 100 for a vehicle according to various exemplary embodiments of the present disclosure may be implemented integrally with the vehicle (for example, an in AVN (audio, video, navigation) device) or may be separable from the vehicle.

According to an exemplary embodiment, the communication module 110 may communicate with an external device. For example, the communication module 110 may communicate with a satellite or a user terminal (for example, a smart phone, a wearable device, or the like).

According to an exemplary embodiment, the communication module 110 may include a radio frequency (RF) module, a cellular module, a wireless-fidelity (Wi-Fi) module, a Bluetooth module, a global navigation satellite system (GLONASS) module, or a near field communication (NFC) module. The navigation device 100 may communicate with the external device through at least one of the modules described above. As an example, the communication module 110 may communicate with the user terminal using Wi-Fi, Bluetooth, or NFC communication. As another example, the communication module 110 (for example, the GNSS module) may receive positional information from a satellite.

According to an exemplary embodiment, the communication module 110 may transmit destination information to the user terminal. According to an exemplary embodiment, the communication module 110 may receive second path information toward a destination from the user terminal. According to an exemplary embodiment, the communication module 110 may transmit display mode information of the display 130 to the user terminal. According to an exemplary embodiment, the communication module 110 may receive second path information having a form corresponding to the display mode information from the user terminal.

According to an exemplary embodiment, the input module 120 (or, a user input device) may receive (or sense) a user input. According to an exemplary embodiment, the input module 120 may include a touch sensor panel for sensing a touch manipulation of a user or a pen sensor panel (for example, a digitizer) for sensing a pen manipulation of the user. According to an exemplary embodiment, the input module 120 may include a motion recognizing sensor for recognizing motion of the user or a speech recognizing sensor for recognizing speech of the user. According to an exemplary embodiment, the input module 120 may include at least one hardware button.

According to an exemplary embodiment, the input module 120 may receive a user input for setting a destination. According to an exemplary embodiment, the input module 120 may receive a user input setting a main path of a plurality of paths toward the destination.

According to an exemplary embodiment, the display 130 may display a user interface. According to an exemplary embodiment, the display 130 may display a plurality of paths toward the destination. According to an exemplary embodiment, the display 130 may display the plurality of path information toward the destination through a user interface provided from the navigation device 100 or a user interface provided from a navigation application installed in the user terminal.

According to an exemplary embodiment, the display 130 may display path information depending on a predetermined display mode. For example, a display mode may include a single mode in which a plurality of path information is displayed on one map, a dual mode in which the plurality of path information is displayed on different maps, and a picture-in-picture (PIP) mode in which one of the plurality of path information is displayed on a main screen and another thereof is displayed on a PIP screen. According to an exemplary embodiment, the display 130 may display the plurality of paths depending on one of the single mode, the dual mode and the PIP mode.

According to an exemplary embodiment, the display 130 may include a plurality of displays. For example, the display 130 may include a display positioned at a center fascia of the vehicle and a display positioned at a cluster.

According to an exemplary embodiment, the input module 120 and the display 130 may also be implemented by, for example, a touch screen that may simultaneously perform a display operation and an operation of sensing a touch manipulation by having an input panel disposed on a display panel.

According to an exemplary embodiment, the memory 140 may store an application (or a program) providing navigation information therein. The application may be installed in, for example, the navigation device and may be executed by the processor 160. According to an exemplary embodiment, the memory 140 may store the navigation information therein. For example, the memory 140 may store map information (for example, roads, buildings, shop names, regulation speeds, and the like), destinations of interest, a destination setting history, a path selecting history, a vehicle driving path history and the like, therein.

According to an exemplary embodiment, the speaker 150 may output an audio signal. For example, the speaker 150 may output one of the plurality of path information as speech.

According to an exemplary embodiment, the processor 160 may control a general operation of the navigation device 100 for a vehicle. For example, the processor 160 may control each of the communication module 110, the input module 120, the display 130, the memory 140, and the speaker 150 to provide the path information to the user according to various exemplary embodiments of the present disclosure. According to an exemplary embodiment, the processor (for example, a microcontroller) 160 may be implemented by a central processing unit (CPU), a graphic processing unit (GPU), or a system-on-chip (SoC) including a memory or the like.

According to an exemplary embodiment, the processor 160 may set a navigation destination. According to an exemplary embodiment, the processor 160 may set a destination depending on the user input received through the input module 120. For example, the user may directly input the destination through the input module 120 or select a specific destination through a search. According to an exemplary embodiment, the processor 160 may set the destination depending on the destination information received through the communication module 110. For example, the user may input the destination using the application installed in the user terminal or select the specific destination through the search. The user terminal may transmit the destination information to the navigation device when the destination is set by the user.

According to an exemplary embodiment, the processor 160 may search a path toward the destination (or a first path) when the destination is set. For example, the processor 160 may search at least one path from a current position of the navigation device 100 to the destination. The current position information of the navigation device 100 may be received through, for example, a GNSS (or GLONASS) module included in the communication module 110.

According to an exemplary embodiment, the processor 160 may transmit the destination information to the user terminal through the communication module 110 when the destination is set. For example, the processor 160 may transmit the destination information to the user terminal when the destination is set depending on the user input received through the input module 120.

According to an exemplary embodiment, the processor 160 may receive path information toward the destination (or second path information) from the user terminal through the communication module 110. According to an exemplary embodiment, the user terminal may search the path toward the destination when the destination is input from the user or the destination information is received from the navigation device 100. According to an exemplary embodiment, the user terminal may transmit the searched path information to the navigation device 100.

According to an exemplary embodiment, the processor 160 may transmit the display mode information to the user terminal through the communication module 110. For example, the processor 160 may transmit the display mode information indicating the single mode, the dual mode, or the PIP mode to the user terminal. According to an exemplary embodiment, the processor 160 may transmit the display mode information together with the destination information to the user terminal when the processor 160 transmits the destination information to the user terminal. According in an exemplary embodiment, the processor 160 may receive path information having a form corresponding to the display mode information from the user terminal through the communication module 110. As an example, the processor 160 may transmit a second path itself (for example, geographic position information of the second path) when the display mode is the single mode. As another example, the processor 160 may receive a path guidance screen (for example, a mirroring screen of the user terminal) provided from the navigation application installed in the user terminal when the display mode is the dual mode. As still another example, the processor 160 may receive a path guidance screen or an icon (for example, a direction indication icon) to be displayed on the PIP screen when the display mode is the PIP mode.

According to an exemplary embodiment, the processor 160 may provide first path information searched by the navigation device 100 and second path information searched by the user terminal to the user. As an example, the processor 160 may display the first path information and the second path information on the display 130. As another example, the processor 160 may output one of the first path information and the second path information through the speaker 150. As still another example, the processor 160 may display the first path information and the second path information on a main display (for example, the display positioned at the center fascia) and display one of the first path information and the second path information on a sub-display (for example, the display positioned at the cluster) in the case in which the navigation device 100 includes a plurality of displays.

According to an exemplary embodiment, the processor 160 may set one of the first path and the second path to the main path. According to an exemplary embodiment, the processor 160 may set the main path depending on the user input received through the input module 120. As another example, the processor 160 may automatically set the main path in consideration of a time required for the vehicle to arrive at the destination, a distance up to the destination, a vehicle driving history, and the like. According to an exemplary embodiment, the processor 160 may set a path other than the path set to the main path to the sub-path. For example, the processor 160 may set the first path to the main path and set the second path to the sub-path.

According to an exemplary embodiment, the processor 160 may provide the first path information and the second path information to the user depending on set states of the main path and the sub-path. As an example, the processor 160 may display the main path to be different from the sub-path. As another example, the processor 160 may output only path information of the main path through the speaker 150.

According to an exemplary embodiment, the processor 160 may display the first path information and the second path information depending on the predetermined display mode. According to an exemplary embodiment, the processor 160 may select the display mode depending on the user input received through the input module 120. According to an exemplary embodiment, the processor 160 may change the display mode depending on the user input received through the input module 120. Hereinafter, the respective display modes will be described in detail with reference to FIGS. 2 to 4.

Figure 2:
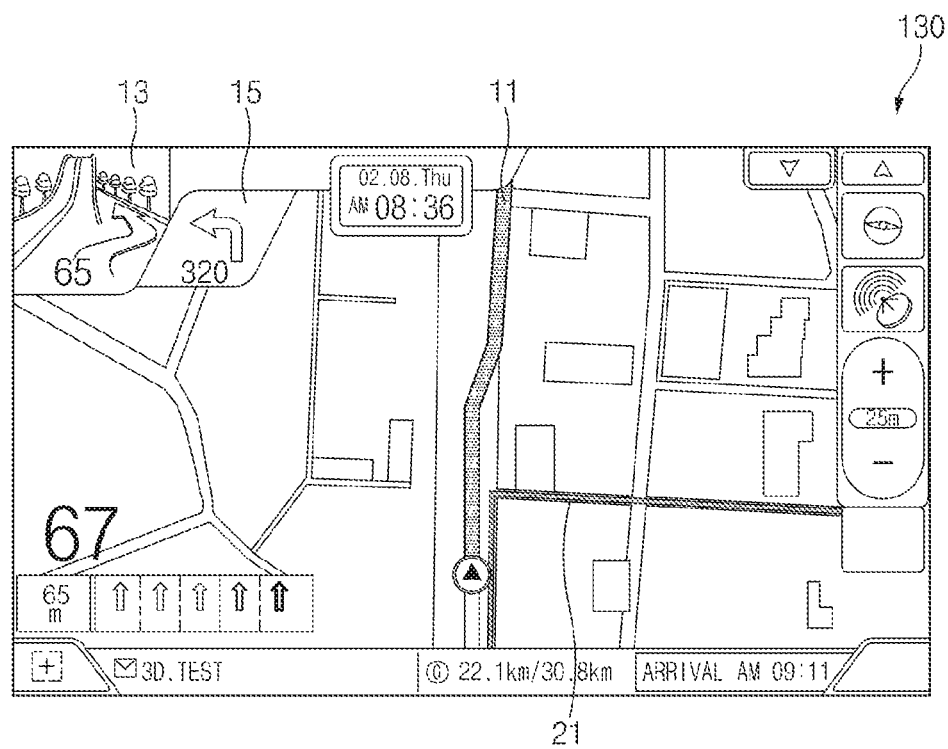
FIG. 2 is a view illustrating path information displayed on a display according to an embodiment of the present disclosure.

FIG. 2 is a view illustrating path information displayed on a display showing a single mode according to an embodiment of the present disclosure.

According to an exemplary embodiment, the processor 160 may display a plurality of path information on one map in the single mode. Referring to FIG. 2, a user interface displayed on the display 130 may include path information 11, 13 and 15 of a main path and path information 21 of a sub-path. According to an exemplary embodiment, the path information of the main path may include a main path 11 displayed on the map and additional information (for example, a progress direction of the main path) 13 and 15 related to the main path. According to an exemplary embodiment, the path information of the sub-path may include a second path 21 displayed on the map. According to an exemplary embodiment, the processor 160 may display only the additional information related to the main path in the single mode.

Figure 3:
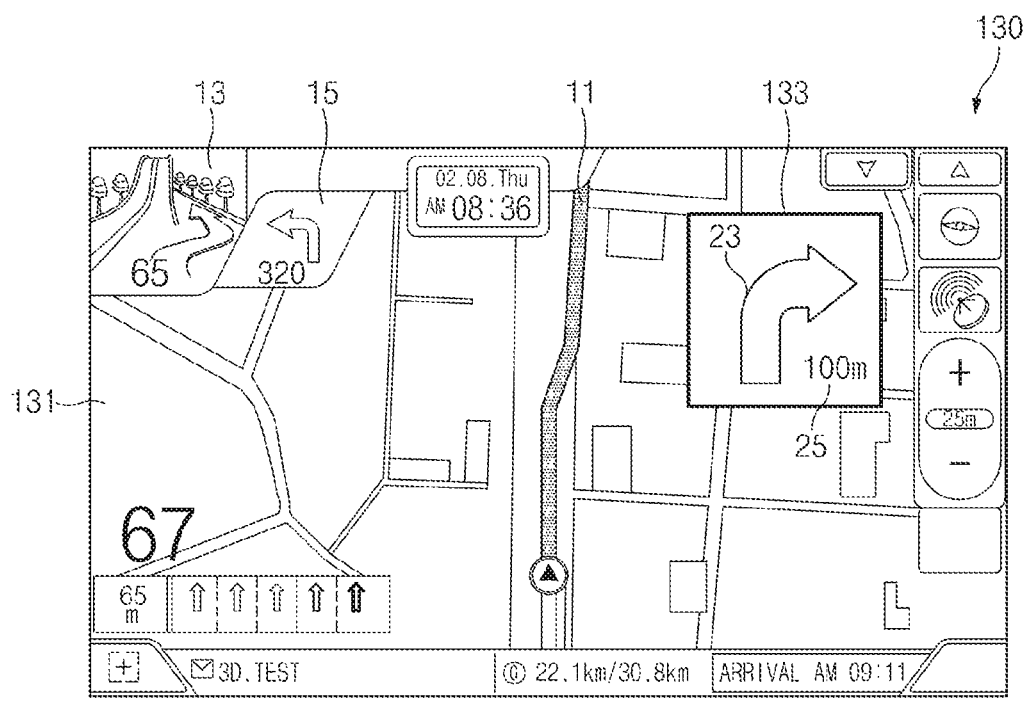
FIG. 3 is a view illustrating path information displayed on a display showing a picture-in-picture (PIP) mode according to an embodiment of the present disclosure.

FIG. 3 is a view illustrating path information displayed on a display showing a PIP mode according to an embodiment of the present disclosure.

According to an exemplary embodiment, the processor 160 may divide the display 130 into a main region (or a main screen) 131 and a PIP region (or a PIP screen) 133 in the PIP mode. According to an exemplary embodiment, the processor 160 may display path information 11, 13 and 15 of a main path on the main region 131 of the display 130. According to an exemplary embodiment, the path information of the main path may include a main path 11 displayed on the map and additional information 13 and 15 related to the main path. According to an exemplary embodiment, the processor 160 may include path information 23 and 25 of a sub-path on the PIP region 133 of the display 130. According to an exemplary embodiment, the path information of the sub-path may include a direction indication icon 23 indicating a direction of the sub-path and a text 25 indicating a remaining distance up to a direction change.

Figure 4:
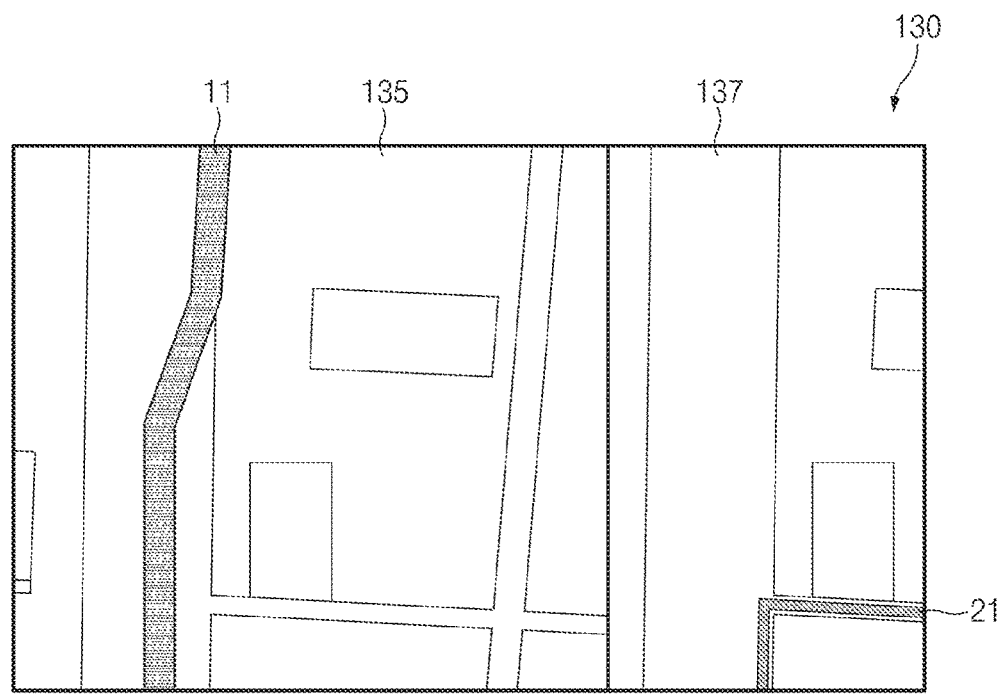
FIG. 4 is a view illustrating path information displayed on a display showing a dual mode according to an embodiment of the present disclosure.

FIG. 4 is a view illustrating path information displayed on a display showing a dual mode according to an embodiment of the present disclosure.

According to an exemplary embodiment, the processor 160 may divide the display 130 into a main region 135 and a sub-region 137 in the dual mode. According to an exemplary embodiment, the processor 160 may display maps on each of the main region 135 and the sub-region 137. According to an exemplary embodiment, the map displayed on the main region 135 may be a map provided from an application installed in the navigation device 100. According to an exemplary embodiment, the map displayed on the sub-region 137 may be a map provided from an application installed in the user terminal. For example, the processor 160 may display the path guidance screen (for example, the mirroring screen of the user terminal) provided from the navigation application installed in the user terminal on the sub-region 137.

According to an exemplary embodiment, the processor 160 may display path information 11 of a main path on the main region 135 of the display 130. According to an exemplary embodiment, the path information of the main path may include a main path 21 displayed on the map. Although not illustrated in FIG. 4, the path information of the main path may include additional information indicating a progress direction of the main path, or the like. According to an exemplary embodiment, the processor 160 may display path information 21 of a sub-path on the sub-region 137 of the display 130. According to an exemplary embodiment, the path information of the sub-path may include a main path 21 displayed on the map. Although not illustrated in FIG. 4, the path information of the sub-path may include additional information indicating a progress direction of the sub-path, or the like.

According to an exemplary embodiment, the processor 160 may display the first path information or the second path information on the basis of the position information received through the communication module 110. For example, the processor 160 may decide a current position of the vehicle using the position information received through the communication module 110 and display the first path information or the second path information on the basis of the current position of the vehicle.

According to an exemplary embodiment, the processor 160 may set the sub-path to, or as, the main path when the position information is not received through the communication module 110. For example, the processor 160 may set the sub-path to the main path when the position information is not received for a predetermined time in a state in which the first path is set to the main path. For example, the processor 160 may provide the first path information on the basis of the position information received through the communication module 110, and the user terminal may provide the second path information to the navigation device on the basis of the position information received through a communication module included in the user terminal. Since the processor 160 may not normally provide the first path when the position information is not received for the predetermined time in the state in which the first path is set to the main path, the processor 160 may set the second path providing the path information on the basis of the position information received in the user terminal to the main path and provide the path information to the user.

According to an exemplary embodiment, the processor 160 may request the user terminal to transmit the position information when the position information is not received through the communication module 110 (for example, the GNSS, or GLONASS, module). According to an exemplary embodiment, the processor 160 may receive the position information from the user terminal through the communication module 110. According to an exemplary embodiment, the processor 160 may display the first path information or the second path information on the basis of the position information received from the user terminal.

According to an exemplary embodiment, the processor 160 may decide whether or not a deviation path is the sub-path when a driving path of the vehicle deviates from the main path. According to an exemplary embodiment, the processor 160 may decide whether or not the driving path of the vehicle deviates from the main path on the basis of the position information received through the communication module 110. According to an exemplary embodiment, the processor 160 may set the sub-path to the main path when the deviation path is the sub-path. For example, the processor 160 may decide that when the driver intends to drive the vehicle up to a destination through the sub-path, the processor 160 sets the sub-path to, or as, the main path, when the deviation path is the sub-path.

According to an exemplary embodiment, the processor 160 may store an actual driving path of the vehicle in the memory 140 when guidance on the path up to the destination ends. A driving path history stored in the memory may be used to search the path up to the destination or set the main path.

Figure 5:
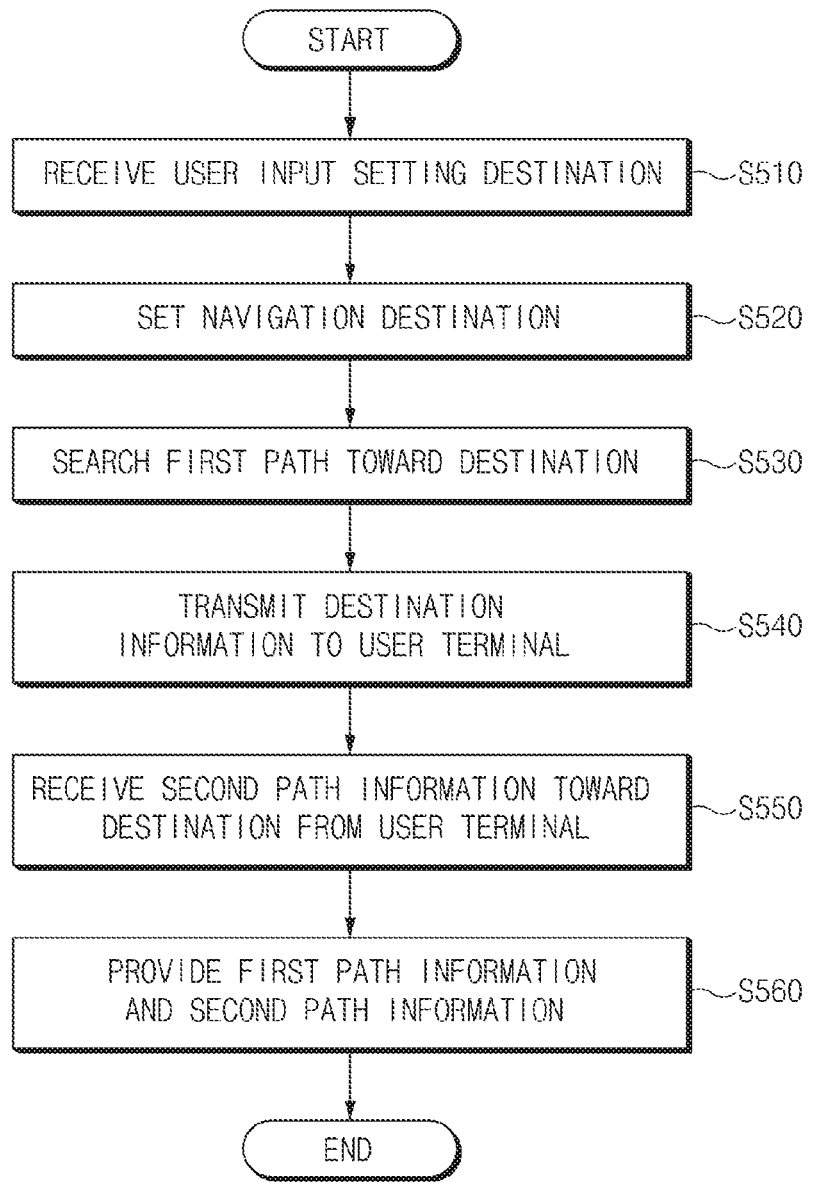
FIG. 5 is a flowchart illustrating a path information providing method of a navigation device for a vehicle according to various exemplary embodiments of the present disclosure.

FIG. 5 is a flowchart illustrating a path information providing method of a navigation device for a vehicle according to various exemplary embodiments of the present disclosure.

The flowchart illustrated in FIG. 5 may be configured to employ, or operate, operations processed in the navigation device 100 illustrated in FIG. 1. Therefore, contents described above in relation to the navigation device 100 with reference to FIGS. 1 to 4, among contents for which a description will be omitted below, may also be applied to the flowchart illustrated in FIG. 5.

Referring to FIG. 5, the navigation device 100 may receive the user input setting the destination (S510). For example, the user may directly input the destination through the input module 120 or select a specific destination through a search.

According to an exemplary embodiment, the navigation device 100 may set the navigation destination depending on the user input (S520).

According to an exemplary embodiment, the navigation device 100 may search the first path toward the destination (S530). For example, the navigation device 100 may search at least one path from a current position of the navigation device 100 to the destination. The current position information of the navigation device 100 may be received through, for example, the GNSS, or GLONASS, module.

According to an exemplary embodiment, the navigation device 100 may transmit the destination information to the user terminal (S540).

According to an exemplary embodiment, the navigation device 100 may receive the second path information toward the destination from the user terminal (S550). According to an exemplary embodiment, the navigation device 100 may transmit the display mode information to the user terminal through the communication module 110. For example, the navigation device 100 may transmit the display mode information indicating the single mode, the dual mode, or the PIP mode to the user terminal. According to an exemplary embodiment, the navigation device 100 may transmit the display mode information together with the destination information to the user terminal that the navigation device 100 transmits the destination information to. According to an exemplary embodiment, the navigation device 100 may receive the path information having a form corresponding to the display mode information from the user terminal through the communication module 110.

According to an exemplary embodiment, the navigation device 100 may provide the first path information and the second path information (S560). As an example, the navigation device 100 may display the first path information and the second path information on the display. As another example, the navigation device 100 may output one of the first path information and the second path information through the speaker. According to an exemplary embodiment, the navigation device 100 may display the first path information and the second path information depending on the predetermined display mode. According to an exemplary embodiment, the navigation device 100 may select the display mode depending on the user input received through the input module. According to an exemplary embodiment, the navigation device 100 may change the display mode depending on the user input received through the input module.

According to an exemplary embodiment, the navigation device 100 may display the first path information or the second path information on the basis of the position information received through the communication module (for example, the GNSS, or GLONASS, module). According to an exemplary embodiment, the navigation device 100 may request the user terminal to transmit the position information when the position information is not received through the communication module. According to an exemplary embodiment, the navigation device 100 may receive the position information from the user terminal through the communication module 110. According to an exemplary embodiment, the navigation device 100 may display the first path information or the second path information on the basis of the position information received from the user terminal. According to an exemplary embodiment, the navigation device 100 may set the sub-path to, or as, the main path when the position information is not received through the communication module. For example, the navigation device 100 may set the sub-path to, or as, the main path when the position information is not received for the predetermined time in the state in which the first path is set to the main path. Since the navigation device 100 may not normally provide the first path when the position information is not received for the predetermined time in the state in which the first path is set to the main path, the navigation device 100 may set the second path providing the path information on the basis of the position information received in the user terminal to the main path and provide the path information to the user.

Figure 6:
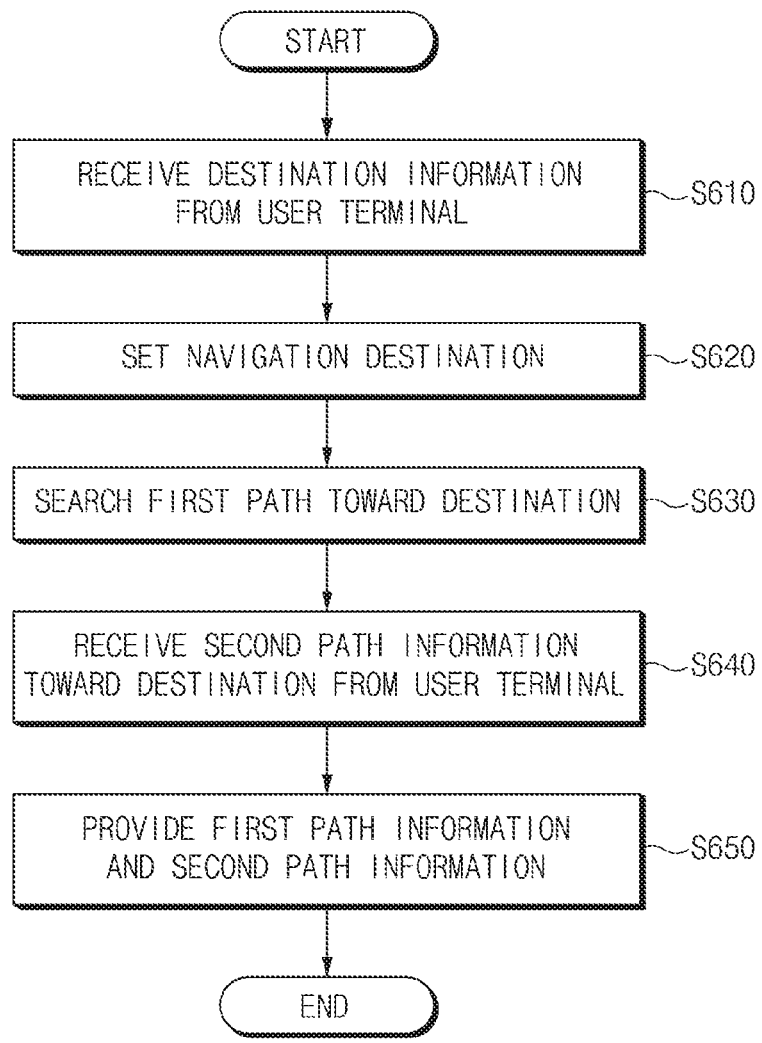
FIG. 6 is a flowchart illustrating a path information providing method of a navigation device for a vehicle according to various exemplary embodiments of the present disclosure.

FIG. 6 is a flowchart illustrating a path information providing method of a navigation device for a vehicle according to various exemplary embodiments of the present disclosure.

The flowchart illustrated in FIG. 6 may be configured of, or may employ or operate, operations processed in the navigation device 100 illustrated in FIG. 1. Therefore, contents described above in relation to the navigation device 100 with reference to FIGS. 1 to 4, among contents for which a description will be omitted below, may also be applied to the flowchart illustrated in FIG. 6.

Referring to FIG. 6, according to an exemplary embodiment, the navigation device 100 may receive the destination information from the user terminal (S610). For example, the user may input the destination using the application installed in the user terminal or select the specific destination through the search. The user terminal may transmit the destination information to the navigation device when the destination is set by the user.

According to an exemplary embodiment, the navigation device 100 may set the navigation destination depending on the received destination information (S620).

According to an exemplary embodiment, the navigation device 100 may search the first path toward the destination (S630). For example, the navigation device 100 may search at least one path from the current position of the navigation device 100 to the destination. The current position information of the navigation device 100 may be received through, for example, the GNSS, or GLONASS, module.

According to an exemplary embodiment, the navigation device 100 may receive the second path information toward the destination from the user terminal (S640). According to an exemplary embodiment, the navigation device 100 may transmit the display mode information to the user terminal through the communication module. For example, the navigation device 100 may transmit the display mode information indicating the single mode, the dual mode, or the PIP mode to the user terminal. According to an exemplary embodiment, the navigation device 100 may receive the path information having the form corresponding to the display mode information from the user terminal through the communication module.

According to an exemplary embodiment, the navigation device 100 may provide the first path information and the second path information (S650). As an example, the navigation device 100 may display the first path information and the second path information on the display. As another example, the navigation device 100 may output one of the first path information and the second path information through the speaker. According to an exemplary embodiment, the navigation device 100 may display the first path information and the second path information depending on the predetermined display mode. According to an exemplary embodiment, the navigation device 100 may select the display mode depending on the user input received through the input module. According to an exemplary embodiment, the navigation device 100 may change the display mode depending on the user input received through the input module 120.

According to an exemplary embodiment, the navigation device 100 may display the first path information or the second path information on the basis of the position information received through the communication module (for example, the GNSS module). According to an exemplary embodiment, the navigation device 100 may request the user terminal to transmit the position information when the position information is not received through the communication module. According to an exemplary embodiment, the navigation device 100 may receive the position information from the user terminal through the communication module 110. According to an exemplary embodiment, the navigation device 100 may display the first path information or the second path information on the basis of the position information received from the user terminal. According to an exemplary embodiment, the navigation device 100 may set the sub-path to the main path when the position information is not received through the communication module. For example, the navigation device 100 may set the sub-path to the main path when the position information is not received for the predetermined time in the state in which the first path is set to the main path. Since the navigation device 100 may not normally provide the first path when the position information is not received for the predetermined time in the state in which the first path is set to the main path, the navigation device 100 may set the second path providing the path information on the basis of the position information received in the user terminal to the main path and provide the path information to the user.

Figure 7:
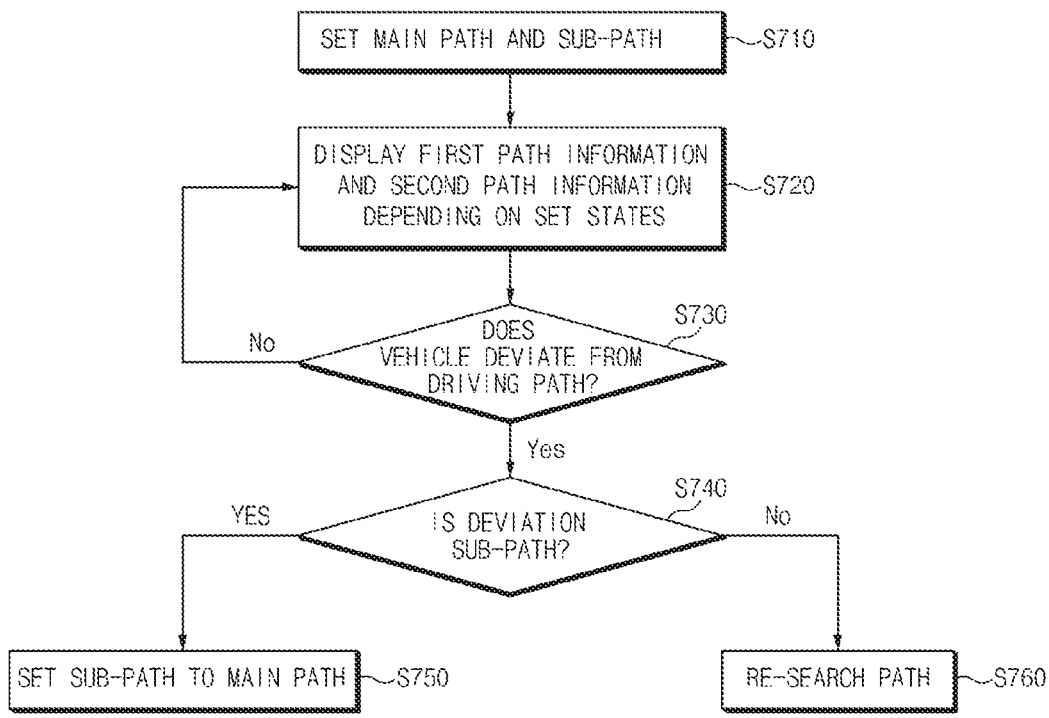
FIG. 7 is a flowchart illustrating a path information providing method of a navigation device for a vehicle according to various exemplary embodiments of the present disclosure.

FIG. 7 is a flow chart illustrating a path information providing method of a navigation device for a vehicle according to various exemplary embodiments of the present disclosure.

The flowchart illustrated in FIG. 7 may correspond to detailed examples of the steps (S560 and S650) of providing the first path information and the second path information illustrated in FIGS. 5 and 6. The flowchart illustrated in FIG.

7 may be configured of, or may employ or operate, operations processed in the navigation device 100 illustrated in FIG. 1. Therefore, contents described above in relation to the navigation device 100 with reference to FIGS. 1 to 4, among contents for which a description will be omitted below, may also be applied to the flow chart illustrated in FIG. 7.

Referring to FIG. 7, the navigation device 100 may set the main path and the sub-path (S710). As an example, the navigation device 100 may set one of the first path and the second path to the main path. According to an exemplary embodiment, the navigation device 100 may set the main path depending on the user input received through the input module. As another example, the navigation device 100 may automatically set the main path in consideration of the time required for the vehicle to arrive at the destination, the distance up to the destination, the vehicle driving history and the like. According to an exemplary embodiment, the navigation device 100 may set a path other than the path set to the main path to the sub-path. For example, the navigation device 100 may set the first path to the main path and set the second path to the sub-path.

According to an exemplary embodiment, the navigation device 100 may provide the first path information and the second path information to the user depending on the set states of the main path and the sub-path (S720). As an example, the navigation device 100 may display the main path to be different from the sub-path. As another example, the navigation device 100 may output only the path information of the main path through the speaker.

According to an exemplary embodiment, the navigation device 100 may decide whether or not the driving path of the vehicle deviates from the main path (S730). According to an exemplary embodiment, the navigation device 100 may decide whether or not the driving path of the vehicle deviates from the main path on the basis of the position information received through the communication module.

According to an exemplary embodiment, the navigation device 100 may provide the first path information and the second path information depending on the set states of the main path and sub-path (S720) when the driving path of the vehicle does not deviate from the main path (S730—No).

According to an exemplary embodiment, the navigation device 100 may decide whether or not the deviation path is the sub-path (S740) when the driving path of the vehicle deviates from the main path (S730—Yes).

According to an exemplary embodiment, the navigation device 100 may set the sub-path to the main path (S750) when the deviation path is the sub-path (S740—Yes).

According to an exemplary embodiment, the navigation device 100 may re-search a path (S760) when the deviation path is not the sub-path (S740—No). For example, the navigation device 100 may again perform the steps (S530 and S540) illustrated in FIG. 5 and the steps (S630 and S640) illustrated in FIG. 6. According to an exemplary embodiment, the navigation device 100 may provide path information depending on the re-searched path when the path is re-searched.

As described above, according to various exemplary embodiments of the present disclosure, a plurality of path information searched in a plurality of devices is simultaneously provided to the user, thereby making it possible to provide various paths, and stably provide path information to the user through another device even in a situation in which one of the navigation device and the user terminal may not normally provide the path information due to a communication defect, or the like.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A navigation device for a vehicle, comprising:
 a communication module for communicating with a user terminal;
 a display; and
 a processor for setting a navigation destination, searching a first path toward the navigation destination, receiving, from the user terminal through the communication module, second path information corresponding to a second path toward the navigation destination, and displaying first path information and the second path information on the display depending on a predetermined display mode,
 wherein the processor displays the first path information on the basis of position information received through the communication module, and requests the user terminal to transmit the position information when the position information is not received for a predetermined time and displays the first path information on the basis of the position information received from the user terminal.

2. The navigation device according to claim 1, further comprising an input module for receiving a user input,
 wherein the processor sets the navigation destination depending on the user input received through the input module.

3. The navigation device according to claim 1, wherein the processor sets the navigation destination depending on destination information received through the communication module.

4. The navigation device according to claim 1, wherein the processor displays the first path information and the second path information on the display depending on one of a single mode in which the first path information and the second path information are displayed on one map, a dual mode in which the first path information and the second path information are displayed on different maps, and a picture-in-picture (PIP) mode in which one of the first path information and the second path information is displayed on a main screen and the other of the first path information and the second path information is displayed on a PIP screen.

5. The navigation device according to claim 1, wherein the processor transmits display mode information to the user terminal through the communication module and receives the second path information having a form corresponding to the display mode from the user terminal.

6. The navigation device according to claim 1, wherein the processor sets one of the first path and the second path to a main path and sets the other of the first path and the second path to a sub-path, and displays the first path information and the second path information on the display depending on set states of the main path and the sub-path.

7. The navigation device according to claim 6, wherein the processor decides whether or not a deviation path is the sub-path when a driving path of the vehicle deviates from the main path, and sets the sub-path to the main path when the deviation path is the sub-path.

8. The navigation device according to claim 6, wherein the processor displays the first path information on the basis of position information received through the communication module and sets the sub-path to the main path when the position information is not received for a predetermined time in a state in which the first path is set to the main path.

9. The navigation device according to claim 6, further comprising a speaker,
   wherein the processor outputs path information of the main path through the speaker.

10. A path information providing method of a navigation device for a vehicle, comprising:
    setting a navigation destination;
    searching a first path toward the navigation destination;
    receiving, from a user terminal through a communication module, second path information corresponding to a second path toward the navigation destination; and
    displaying first path information and the second path information on a display depending on a predetermined display mode,
    wherein the step of displaying the first path information and the second path information on the display includes:
        receiving position information through the communication module;
        displaying the first path information on the basis of the position information;
        requesting the user terminal to transmit the position information when the position information is not received for a predetermined time; and
        displaying the first path information on the basis of the position information received from the user terminal.

11. The path information providing method according to claim 10, wherein the step of setting the navigation destination includes:
    receiving a user input setting the navigation destination through an input module; and
    setting the navigation destination depending on the user input.

12. The path information providing method according to claim 10, wherein the step of setting the navigation destination includes:
    receiving destination information from the user terminal through the communication module; and
    setting the navigation destination depending on the received destination information.

13. The path information providing method according to claim 10, wherein the step of displaying the first path information and the second path information on the display includes displaying the first path information and the second path information on the display depending on one of a single mode in which the first path information and the second path information are displayed on one map, a dual mode in which the first path information and the second path information are displayed on different maps, and a picture-in-picture (PIP) mode in which one of the first path information and the second path information is displayed on a main screen and the other of the first path information and the second path information is displayed on a PIP screen.

14. The path information providing method according to claim 10, wherein the step of receiving the second path information includes:
    transmitting display mode information to the user terminal through the communication module; and
    receiving the second path information having a form corresponding to the display mode from the user terminal.

15. The path information providing method according to claim 10, wherein the step of displaying the first path information and the second path information on the display includes:
    setting one of the first path and the second path to a main path and setting the other of the first path and the second path to a sub-path; and
    displaying the first path information and the second path information on the display depending on set states of the main path and the sub-path.

16. The path information providing method according to claim 15, wherein the step of displaying the first path information and the second path information on the display includes:
    deciding whether or not a deviation path is the sub-path when a driving path of the vehicle deviates from the main path; and
    setting the sub-path to the main path when the deviation path is the sub-path.

17. The path information providing method according to claim 15, wherein the step of displaying the first path information and the second path information on the display includes:
    setting the first path to the main path and setting the second path to the sub-path; and
    setting the second path to the main path when position information is not received for a predetermined time from the communication module.

18. The path information providing method according to claim 15, further comprising outputting path information of the main path through a speaker.

* * * * *